United States Patent
Zuo et al.

(10) Patent No.: US 9,407,584 B2
(45) Date of Patent: Aug. 2, 2016

(54) INSTANT MESSAGING TERMINAL AND METHOD FOR DISPLAYING SESSION MESSAGE IN REAL TIME

(71) Applicant: TENCENT TECHNOLOGY (SHENZHEN) COMPANY LIMITED, Shenzhen, Guangdong (CN)

(72) Inventors: Xiaoxiang Zuo, Shenzhen (CN); Jing Li, Shenzhen (CN)

(73) Assignee: Tencent Technology (Shenzhen) Company Limited, Shenzhen (CN)

(*) Notice: Subject to any disclaimer, the term of this patent is extended or adjusted under 35 U.S.C. 154(b) by 254 days.

(21) Appl. No.: 14/020,010

(22) Filed: Sep. 6, 2013

(65) Prior Publication Data

US 2014/0006533 A1    Jan. 2, 2014

Related U.S. Application Data

(63) Continuation of application No. PCT/CN2012/076398, filed on Jun. 1, 2012.

(30) Foreign Application Priority Data

Aug. 10, 2011  (CN) .......................... 2011 1 0227806

(51) Int. Cl.
*H04L 12/58*  (2006.01)
*G06F 17/21*  (2006.01)

(52) U.S. Cl.
CPC .............. *H04L 51/04* (2013.01); *G06F 17/214* (2013.01)

(58) Field of Classification Search
CPC .............. G06F 17/2247; G06F 17/214; G06F 17/30011; H04L 51/04

USPC .......................................................... 709/206
See application file for complete search history.

(56) References Cited

U.S. PATENT DOCUMENTS 8,090,794 B1 *  1/2012  Kilat ................. G06F 17/30867
                                                   709/203
2003/0124502 A1 *  7/2003  Chou ........................... 434/350

(Continued)

FOREIGN PATENT DOCUMENTS

CN          1913499 A      2/2007
CN          101174184 A    5/2008

(Continued)

OTHER PUBLICATIONS

International Search Report in international application No. PCT/CN2012/076398, mailed on Sep. 13, 2012.

(Continued)

*Primary Examiner* — Ruolei Zong
(74) *Attorney, Agent, or Firm* — Baker Hostetler LLP

(57) ABSTRACT

The present disclosure discloses an Instant Messaging (IM) terminal and a method for displaying a session message in real time. The method includes: obtaining user inputted literal contents and a font identifier of a user selected personalized font; invoking a personalized font configuration file corresponding to the font identifier according to the font identifier; synthesizing the personalized font configuration file and the literal contents into a session message and displaying the session message in real time. By implementing the present disclosure, when plotting characters, the IM terminal in real time is able to statically synthesize a personalized font according to literal contents of a message and a personalized font configuration file corresponding to a font identifier, which greatly satisfies the user requirements of inputting and displaying the personalized font in real time.

12 Claims, 4 Drawing Sheets

(56) References Cited

U.S. PATENT DOCUMENTS

| | | | |
|---|---|---|---|
| 2005/0050474 A1* | 3/2005 | Bells et al. | 715/747 |
| 2006/0004584 A1* | 1/2006 | Knight | 705/1 |
| 2008/0079730 A1 | 4/2008 | Zhang | |
| 2010/0199174 A1* | 8/2010 | Leonov et al. | 715/255 |
| 2012/0143948 A1* | 6/2012 | Archambault et al. | 709/204 |

FOREIGN PATENT DOCUMENTS

| | | |
|---|---|---|
| CN | 101494618 A | 7/2009 |
| CN | 101742726 A | 6/2010 |
| CN | 102130842 A | 7/2011 |

OTHER PUBLICATIONS

English Translation of the Written Opinion of the International Search Authority in international application No. PCT/CN2012/076398, mailed on Sep. 13, 2012.

Notification of the First Office Action of Chinese application No. 201110227806.0, issued on Aug. 24, 2015.

Notification of the Second Office Action of Chinese application No. 201110227806.0 , issued on Nov. 23, 2015.

* cited by examiner

INSTANT MESSAGING TERMINAL AND METHOD FOR DISPLAYING SESSION MESSAGE IN REAL TIME

CROSS-REFERENCE TO RELATED APPLICATIONS

This application is a continuation of PCT/CN2012/076398, filed on Jun. 1, 2012, which claims priority to CN 201110227806.0, filed Aug. 10, 2011, entitled "Instant Messaging (IM) Terminal and Method for Displaying Session in Real Time," and the applicant is TENCENT TECHNOLOGY (SHENZHEN) COMPANY LIMITED, each of the disclosures of which is hereby incorporated by reference in their entirety.

TECHNICAL FIELD

The present disclosure relates to computer communications, and more particularly to an IM terminal and a method for displaying a session message in real time.

BACKGROUND

Up to now, network IM tools, which have been accepted by most netizens, are widely applied not only in daily entertainment, but also in users' work.

The most fundamental function of IM tools is to chat, interact and communicate with a contact person by utilizing IM. In IM tools of the prior art, fonts used during communication among the contacts, especially literal communication, are relatively common and somewhat inflexible and fail to bring good use effect for users. The prior art further provides a technical solution to input a personalized font in a session window of an IM terminal. However, the personalized font needs to be rendered dynamically, i.e. the personalized font needs to be rendered constantly during a process of displaying the personalized font in the session window, thus failing to satisfy the requirements of an IM terminal user to display in real time an inputted personalized font while inputting the personalized font in the session window.

SUMMARY

The present disclosure provides a method for displaying a session message in real time and an IM terminal, which are able to satisfy the user requirements of inputting and displaying a personalized font in real time.

The present disclosure provides a method for displaying a session message in real time. The method includes:
  obtaining user inputted literal contents and a font identifier of a user selected personalized font;
  invoking a personalized font configuration file corresponding to the font identifier according to the font identifier;
  synthesizing the personalized font configuration file and the literal contents into a session message and displaying the session message in real time.

Correspondingly, the present disclosure further provides an IM terminal. The IM terminal includes:
  a font identifier obtaining module configured to obtain user inputted literal contents and a font identifier of a user selected personalized font;
  a configuration file invoking module configured to, according to the font identifier obtained by the font identifier obtaining module, invoke a personalized font configuration file corresponding to the font identifier; and
  a personalized font synthesizing module configured to synthesize the personalized font configuration file and the literal contents into a session message, and to display the session message in real time.

By implementing the present disclosure, when plotting characters, the IM terminal is able to statically synthesize a personalized font in real time according to literal contents of a message and a personalized font configuration file corresponding to a font identifier without dynamic rendering and without consuming local memory of the IM terminal, thus greatly satisfying the user requirements of inputting and displaying the personalized font in real time.

BRIEF DESCRIPTION OF THE DRAWINGS

To more clearly illustrate the embodiments of the present disclosure or the technical solutions in the prior art, the following briefly introduces the accompanying drawings to be used in describing the embodiments and the prior art. Obviously, the accompanying drawings in the following description are merely some embodiments of the present disclosure. For those skilled in the art, other accompanying drawings may be obtained without creative efforts according to these accompanying drawings.

DETAILED DESCRIPTION

The technical problem to be solved by the present disclosure is that relevant existing technologies fail to meet users personalized requirements during chatting via IM terminals, and that dynamically-rendered personalized fonts provided by existing technologies will result in slow display of session messages. To solve the existing disadvantages above, the present disclosure provides a method for displaying a session message in real time and an IM terminal.

Figure 1:
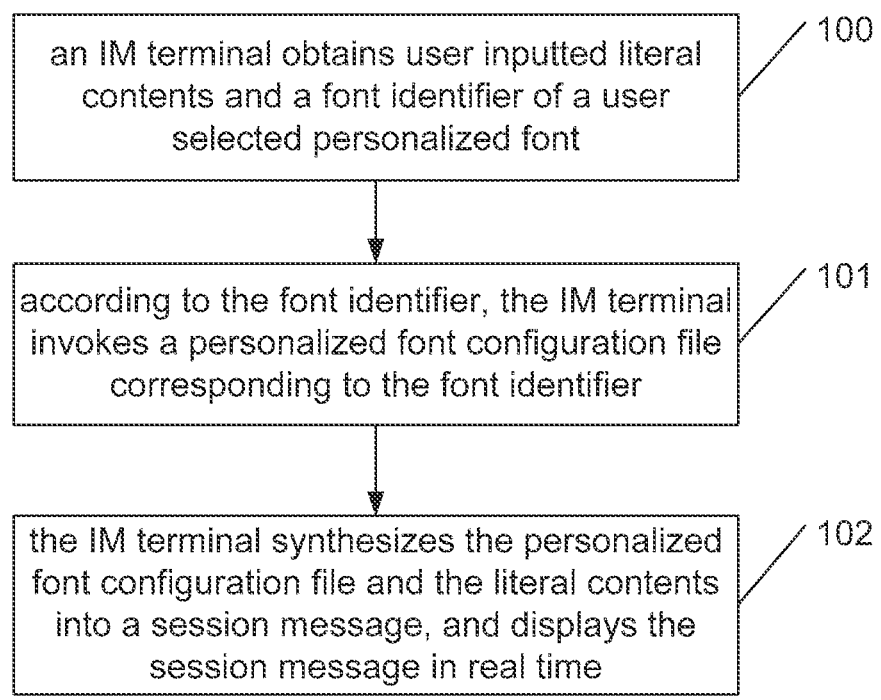
FIG. 1 is a flowchart of a method for displaying a session message in real time according to a first embodiment of the present disclosure.

Referring to FIG. 1, a method for displaying a session message in real time according to the first embodiment of the present disclosure may specifically include the following steps:

Step 100: An IM terminal obtains user inputted literal contents and a font identifier of a user selected personalized font.

Step 101: According to the font identifier, the IM terminal invokes a personalized font configuration file corresponding to the font identifier.

Step 102: The IM terminal synthesizes the personalized font configuration file and the literal contents into a session message, and displays the session message in real time.

By implementing the present disclosure, when plotting characters, a personalized font can be statically synthesized by the IM terminal in real time according to literal contents of a message and a personalized font configuration file corresponding to a font identifier without dynamic rendering and without consuming local memory of the IM terminal, thus greatly satisfying the user requirements of inputting and displaying the personalized font in real time.

Figure 2:
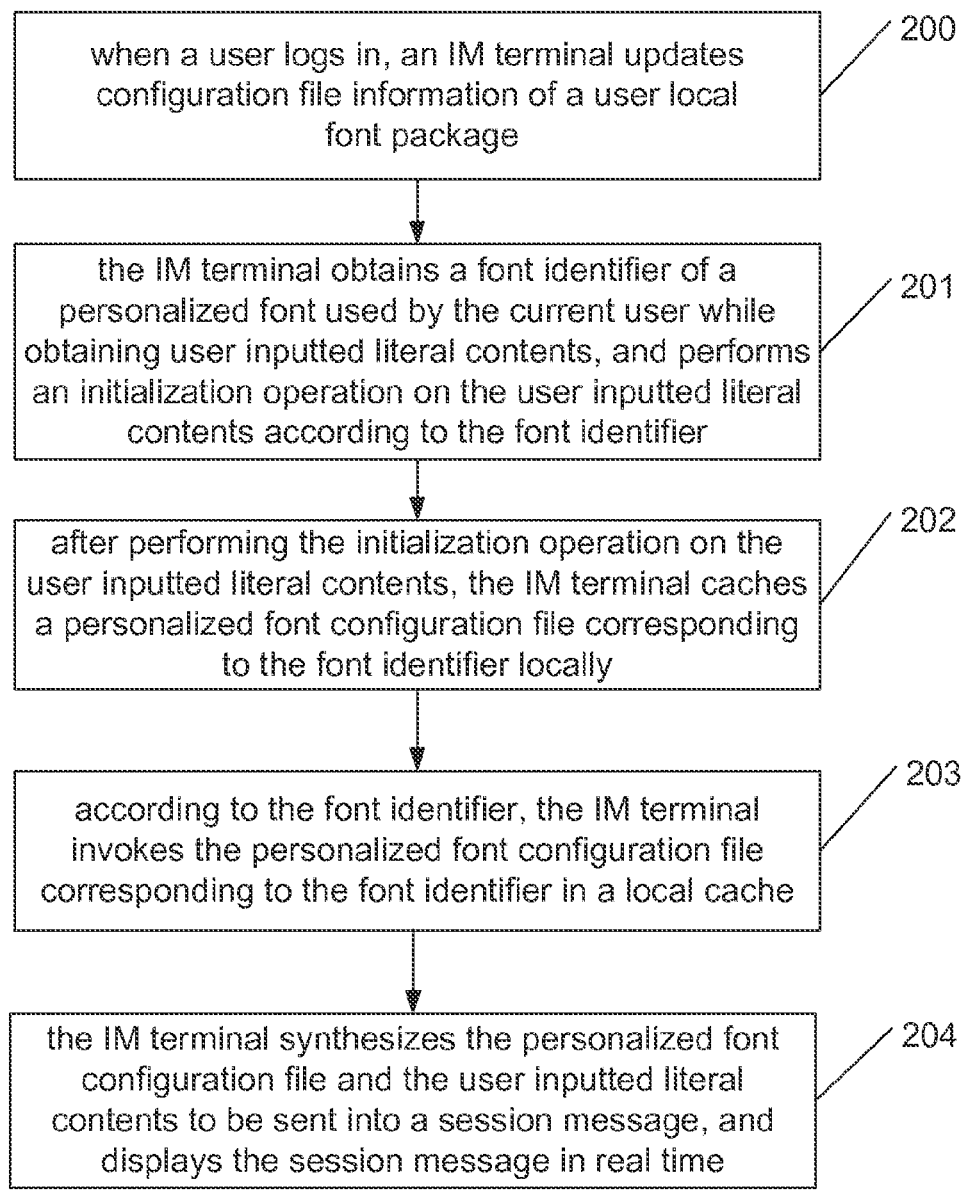
FIG. 2 is a flowchart of a method for displaying a session message in real time according to a second embodiment of the present disclosure.

Referring to FIG. 2, a method for displaying a session message in real time according to the second embodiment of the present disclosure may specifically include the following steps:

Step 200: When a user logs in, an IM terminal updates configuration file information of a user local font package. It should be noted that, configuration files of each set of personalized fonts are recorded in an Extensible Markup Language (XML) form, and it only needs to update a configuration file of a server for operation and updating of a subsequent product. Of course, it is only an example illustrated here and the configuration files may be recorded in other forms.

Step 201: The IM terminal obtains a font identifier of a personalized font used by the current user while obtaining user inputted literal contents, and performs an initialization operation on the user inputted literal contents according to the font identifier;

specifically, the initialization operation performed on the user inputted literal contents includes: initializing a font background image and a dynamic font switching frequency, setting for each frame font the font size, a font type, plotting of coordinates, etc.

Step 202: After performing the initialization operation on the user inputted literal contents, the IM terminal caches a personalized font configuration file corresponding to the font identifier locally;

Step 203: According to the font identifier, the IM terminal invokes from a local cache the personalized font configuration file corresponding to the font identifier;

Step 204: The IM terminal synthesizes the personalized font configuration file and the user inputted literal contents to be sent into a session message, and displays the session message in real time.

Specifically, the IM terminal will assign values to parameters of the personalized font configuration file recorded in XML format to synthesize each character of the literal contents into a personalized font respectively.

The following is an example of a configuration file in XML form:

Generally, the configuration file recorded in XML form includes three sections: the first section is a configuration file header, the second section is background image information, and the third section is font information.

Contents mainly recorded in the configuration file header of the first section are the following parameters and values can be assigned to the following parameters during a process of synthesizing a personalized font to generate a corresponding font effect:

CFID: font ID. A value of "2011", for example, may be assigned to the font ID.

CFName: font name. A value of "rainbow font", for example, may be assigned to the font name.

CFPreviewName: preview name. A value of "2011_Preview", for example, may be assigned to the preview name.

CF_Cx: preview width in pixels. A value of "20", for example, may be assigned to the preview width, which means that the width of the preview is 20.

CF_Cy: preview height in pixels. A value of "20", for example, may be assigned to the preview height, which means that the height of the preview is 18.

CFType: synthesizing type. Values may be assigned to obtain three types: Type_Alpha (alpha-blending synthesis, such as flash font), Type_Normal (characters written on background) and Type_NoBkg (no background, only changes of font color and font position).

Contents mainly recorded in the background image information of the second section of the configuration file recorded in XML form are the following parameters, and values can be assigned to the following parameters during a process of synthesizing a personalized font to generate a background effect of a corresponding font:

nFrame: representing the number of background frames. A value of "3", for example, may be assigned to the number of background frames, which means that the number of background frames is 3 frames.

nElapse: representing the interval between frames in milliseconds. A value of "100", for example, is assigned to the interval, which means that the time interval between frames is 100 milliseconds.

CycNum: cycle number, representing the number of characters in a cycle. A value of "4", for example, is assigned to the cycle number, which means that there are four characters in each cycle.

Pic0: the name of a first background image. A value of "naiping17a.png", for example, is assigned to the name of the first background image, which means that the first background image is an image related to naiping17a.

Pic1: the name of a second background image. A value of "naiping17a.png", for example, is assigned to the name of the second background image, which means that the second background image is also an image related to naiping17a.

Contents mainly recorded in the font information of the second section of the configuration file recorded in XML form are the following parameters, and values can be assigned to the following parameters during a process of synthesizing a personalized font to generate a corresponding font effect:

nFrame: representing the number of background frames. A value of "3", for example, is assigned to the number of background frames, which means that the number of background frames is 3 frames.

nElapse: representing the interval between frames in milliseconds. A value of "100", for example, is assigned to the interval, which means that the time interval between frames is 100 milliseconds.

CycNum: cycle number, representing the number of characters for color cycle. A value of "4", for example, is assigned to the cycle number, which means a color cycle is performed every 4 characters.

CycPos: the number of characters for position cycle. A value of "2", for example, is assigned to the number of characters for position cycle, which means that a position cycle is performed every 2 characters.

FontType: font type. A value of "bold", for example, is assigned to the font type.

CFSize: font size. A value of "9", for example, is assigned to the font size.

IsBold: whether the font is bold. For example, a value of "1" assigned means that the font is bold, and a value of "0" assigned means that the font is not bold.

CFPostion0: position of a first character. For example, a value of "5_10" assigned means the top left corner of a font frame, 5 pixels from the left side and 10 pixels from the top.

CFPostion1: position of a second character. For example, a value of "10_10" assigned means the top left corner of a font frame, 10 pixels from the left side and 10 pixels from the top.

COLORREF0: color value of a first character. For example, a value of "ff7607" assigned means that the color of the first character is purple represented by ff7607.

COLORREF1: color value of a second character. For example, a value of "d6e528" assigned means that the color of the second character is green represented by d6e528.

It should be noted that personalized fonts provided by the present disclosure have three types, most of which are png images with Alpha transparency. It should be noted that the Alpha color channel is an 8-bit gray channel.

The channel utilizes 256 gray-levels to record the transparency information in an image and define a transparent area, an opaque area and a semi-transparent area, wherein black represents full transparency, white represents opacity and gray represents semi-transparency, while png is an image storage format. Further, each character in a session message corresponds to an Object Linking and Embedding (OLE) control, and each OLE control has a png image of a corresponding font synthesized from each character. Each session message is provided with a session message manager which has all OLE controls of this message. The session message manager is configured to control dynamic processing (e.g. starting, stopping and dynamic frequency switching) of the message. At the moment, the user of the IM terminal can see a display effect of the personalized font to be sent by the user.

Finally, the IM sends the literal contents and the font identifier of the personalized font to an IM terminal receiving the session message.

By implementing the present disclosure, in an IM terminal that sends a session message, after a user inputs characters by using a personalized font template, the IM terminal, when plotting the characters, can synthesize a personalized font in real time according to literal contents of the message and a personalized font configuration file corresponding to a font identifier without consuming local memory of the IM terminal. Not only users' personalized requirements can be satisfied, but also users' operational performance is greatly improved. A further technical effect of implementation of the present disclosure is that when transmitting the session message to a peer IM terminal, the IM terminal only transmits the literal contents and the font identifier, thus saving transmission resources and improving the transmission speed.

Figure 3:
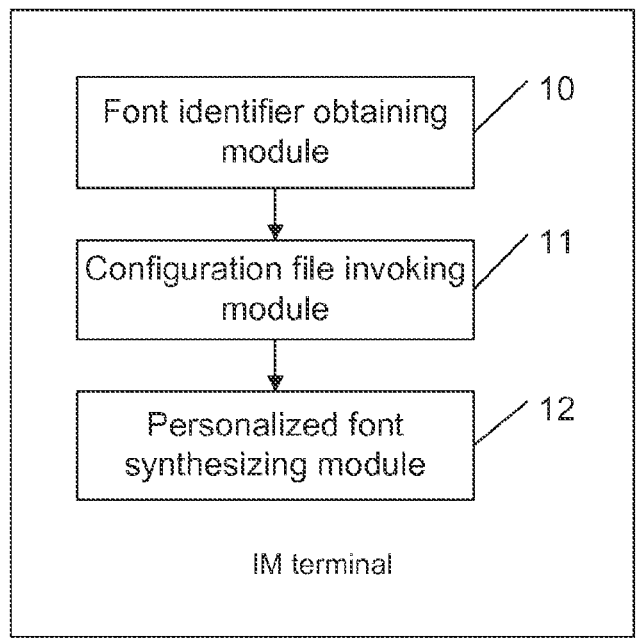
FIG. 3 is a structure diagram illustrating an IM terminal according to a first embodiment of the present disclosure.

Referring to FIG. 3, an IM terminal provided by the first embodiment of the present disclosure functions as a receiving terminal of a session message during a session process and specifically includes:

a font identifier obtaining module 10 configured to obtain user inputted literal contents and a font identifier of a user selected personalized font;

a configuration file invoking module 11 configured to, according to the font identifier obtained by the font identifier obtaining module, invoke a personalized font configuration file corresponding to the font identifier; and a personalized font synthesizing module 12 configured to synthesize the personalized font configuration file and the literal contents into a session message, and to display the session message in real time.

It should be noted that the IM terminal provided by the present disclosure may be an IM client, or may be a WEB IM terminal.

Figure 4:
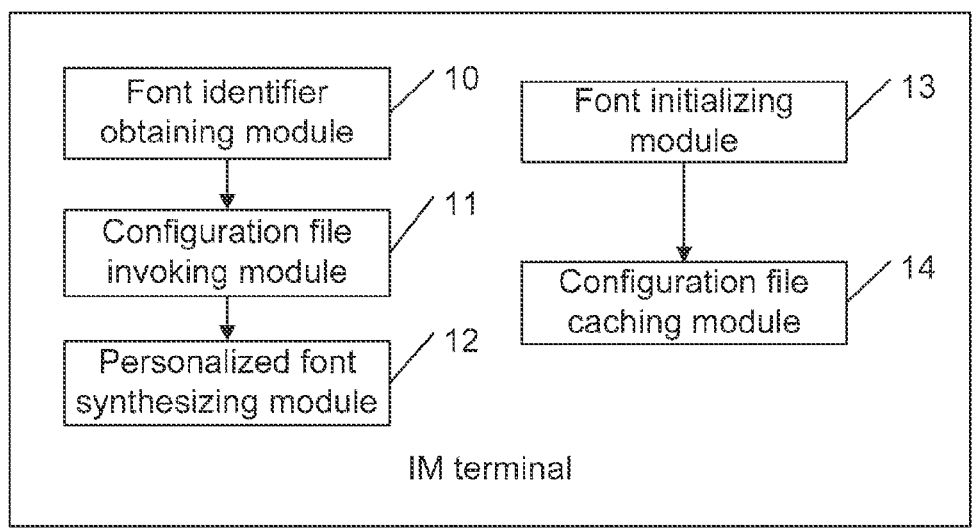
FIG. 4 is a structure diagram illustrating an IM terminal according to a second embodiment of the present disclosure.

Referring to FIG. 4, besides each module included in the first embodiment, an IM terminal provided by the second embodiment of the present disclosure further includes a font initializing module 13 and a configuration file caching module 14.

The font initializing module 13 configured to, according to the font identifier obtained by the font identifier obtaining module 10, perform an initialization operation on the literal contents.

The initialization operation performed by the font initializing module 13 on the user inputted literal contents includes: initializing a font background image, initializing a dynamic font switching frequency, and setting for each frame font the font size, a font type, plotting of coordinates, etc.

The configuration file caching module 14 configured to cache the personalized font configuration file corresponding to the font identifier locally.

It should be noted that the configuration file caching module 14 caches the corresponding personalized font configuration file only when the user uses the personalized font corresponding to the font identifier for the first time. When the user uses the personalized font corresponding to the font identifier for a second time, the corresponding personalized font configuration file does not need to be cached again, the corresponding personalized font configuration file can be invoked by the configuration file invoking module 11 from the personalized font configuration files cached by the configuration file caching module 14.

Figure 5:
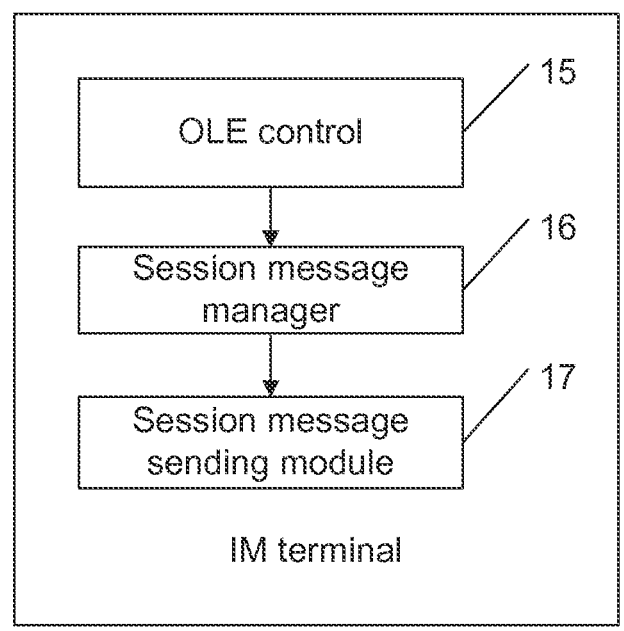
FIG. 5 is a structure diagram illustrating an IM terminal according to a third embodiment of the present disclosure.

Referring to FIG. 5, besides each module (not shown in the figure) included in the first embodiment and the second embodiment, an IM terminal provided by the third embodiment of the present disclosure further includes:

an OLE control 15 configured to control each literal image synthesized by the personalized font synthesizing module 12; and a session message manager 16 configured to, by controlling the OLE control 15, display in a session window of the IM terminal, a session message consisting of literal images having Alpha transparency and synthesized by the personalized font synthesizing module 12.

When the personalized font synthesizing module 12 is configured to assign values to parameters of the personalized font configuration file recorded in XML form, each character in the literal contents is synthesized into a literal image with Alpha transparency, each character is controlled by a corresponding OLE control 15 and each OLE control 15 has a png image of a corresponding font synthesized from each character. Each session message corresponds to a session message manager 16. The session message manager 16 has all OLE controls 15 of the message, and the session message manager 16 is configured to control dynamic processing (e.g. starting, stopping, and dynamic frequency switching) of the session message. At the moment, the user of the IM terminal can see a display effect of the personalized font to be sent by the user.

It should be noted that, in order to provide performance, a personalized font is not synthesized for a session message which is not in a visible area of the session widow, and only a visible font is synthesized in real time.

In addition, as shown in FIG. 5, the IM terminal provided in the third embodiment of the present disclosure may further include:

a session message sending module 17 configured to send the literal contents and the font identifier of the personalized font to an IM terminal receiving the session message.

In the example, the above modules of the IM terminal provided by the three embodiments of the present disclosure may be stored in a memory and executed by a processor in the IM terminal.

By implementing an IM terminal provided by the present disclosure, after a user inputs characters by using a personalized font template, the IM terminal, when plotting the characters, can search a corresponding personalized font configuration file in a local cache according to a font identifier selected and used by the user, and then dynamically synthesize a personalized font in real time according to personalized font configuration file without consuming local memory of the IM terminal. By implementing the present disclosure, not only users' personalized requirements can be satisfied, but also users' operational performance is greatly improved.

Those skilled in the art may understand that all or part of the flows in the methods according to the foregoing embodiments may be implemented by a computer program instructing relevant hardware. The program may be stored in a computer-readable storage medium. When the program is executed, the flows of the embodiments of each method, for example, may be included. The computer-readable storage medium may be a magnetic disk, an optical disk, a Read-Only Memory (ROM), a Random Access Memory (RAM), and so on.

The foregoing descriptions are merely preferred embodiments of the present disclosure. It should be noted that for those skilled in the art, several improvements and modifications may be made without departing from the principle of the present disclosure, and these improvements and modifications should also regarded as the protection scope of the present disclosure.

The invention claimed is:

1. A method for displaying a session message in real time, comprising:
    obtaining user inputted literal contents and a font identifier of a user selected personalized font;
    invoking a personalized font configuration file corresponding to the font identifier according to the font identifier; and
    synthesizing the personalized font configuration file and the literal contents into a session message and displaying the session message in real time;
    wherein the step of synthesizing the personalized font configuration file and the literal contents into a session message and displaying the session message in real time comprises: assigning values to parameters of the personalized font configuration file to synthesize each character of the literal contents into a personalized font respectively, and displaying, by a session message manager, the session message consisting of the personalized font in a session window by controlling an Object Linking and Embedding (OLE) control; and
    wherein the personalized font has a literal image with Alpha transparency; each synthesized personalized font is controlled by the OLE control.

2. The method according to claim 1, further comprising a step, preceding the step of invoking the personalized font configuration file corresponding to the font identifier according to the font identifier, of: performing an initialization operation on the literal contents according to the font identifier.

3. The method according to claim 2, wherein the step of invoking the personalized font configuration file corresponding to the font identifier according to the font identifier comprises: according to the font identifier, invoking the personalized font configuration file corresponding to the font identifier from a local cache.

4. The method according to claim 3, wherein the personalized font configuration file is recorded in an Extensible Markup Language form.

5. The method according to claim 2, wherein the step of performing the initialization operation on the literal contents according to the font identifier comprises:
    initializing a font background image and a dynamic font switching frequency; and
    setting a font size, a font type and plotting coordinates for each frame font.

6. The method according to claim 3, wherein the step of performing the initialization operation on the literal contents according to the font identifier comprises:
    initializing a font background image and a dynamic font switching frequency; and
    setting a font size, a font type and plotting coordinates for each frame font.

7. The method according to claim 4, wherein the step of performing the initialization operation on the literal contents according to the font identifier comprises:
    initializing a font background image and a dynamic font switching frequency; and
    setting a font size, a font type and plotting coordinates for each frame font.

8. An Instant Messaging (IM) terminal, comprising:
    a memory storing programming instructions;
    a processor configured to be a capable of executing the stored programming instructions to:
        obtain user inputted literal contents and a font identifier of a user selected personalized font;
        according to the font identifier obtained, invoke a personalized font configuration file corresponding to the font identifier; and
        assign values to parameters of the personalized font configuration file to synthesize each character of the literal contents into a personalized font respectively, and display the session message consisting of the personalized font in a session window in real time;
    an Object Linking and Embedding (OLE) control configured to control each literal image; and
    a session message manager configured to, by controlling the OLE control, display in a session window a session message consisting of literal images having Alpha transparency.

9. The IM terminal according to claim 8, wherein the processor is further configured to be capable of executing the stored programming instructions to according to the font identifier obtained, perform an initialization operation on the literal contents.

10. The IM terminal according to claim 9, wherein the processor is further configured to be capable of executing the stored programming instructions to cache the personalized font configuration file corresponding to the font identifier locally; and
    according to the font identifier, invoke the personalized font configuration file corresponding to the font identifier.

11. The IM terminal according to claim 10, wherein the personalized font configuration file is recorded in an Extensible Markup Language form.

12. The IM terminal according to claim 11, wherein the processor is further configured to be capable of executing the stored programming instructions to assign values to parameters of the personalized font configuration file, and to synthesize each character in the literal contents into a literal image with Alpha transparency.

* * * * *